(12) United States Patent
Pan et al.

(10) Patent No.: US 11,809,979 B2
(45) Date of Patent: Nov. 7, 2023

(54) MISMATCH DETECTION MODEL (71) Applicant: Walmart Apollo, LLC, Bentonville, AR (US)

(72) Inventors: Yanxin Pan, Sunnyvale, CA (US); Swagata Chakraborty, Santa Clara, CA (US); Abhinandan Krishnan, Sunnyvale, CA (US); Abon Chaudhuri, Sunnyvale, CA (US); Aakash Mayur Mehta, San Francisco, CA (US); Edison Mingtao Zhang, San Francisco, CA (US); Kyu Bin Kim, Mountain View, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 694 days.

(21) Appl. No.: 16/779,510

(22) Filed: Jan. 31, 2020

(65) Prior Publication Data

US 2021/0241076 A1 Aug. 5, 2021

(51) Int. Cl.
G06N 3/04 (2023.01)
G06Q 30/06 (2023.01)
G06N 3/08 (2023.01)
G06N 3/045 (2023.01)
G06Q 30/0601 (2023.01)
G06N 3/043 (2023.01)

(52) U.S. Cl.
CPC ............ *G06N 3/045* (2023.01); *G06N 3/043* (2023.01); *G06Q 30/0633* (2013.01); *G06N 3/08* (2013.01)

(58) Field of Classification Search
CPC ....... G06N 3/0454; G06N 3/0436; G06N 3/08
See application file for complete search history.

(56) References Cited

U.S. PATENT DOCUMENTS

| 9,646,262 | B2 | 5/2017 | Phillipps et al. |
| 9,953,357 | B2 | 4/2018 | Ainsworth, III et al. |
| 10,387,900 | B2* | 8/2019 | Bledsoe .............. G06F 16/2477 |
| 10,664,512 | B1* | 5/2020 | He .................. G06N 3/045 |
| 11,250,042 | B2* | 2/2022 | Chang ................ G06F 16/313 |
| 2011/0264641 | A1 | 10/2011 | Yang |
| 2015/0039473 | A1 | 2/2015 | Hu et al. |

(Continued)

*Primary Examiner* — Ann J Lo
*Assistant Examiner* — Van C Mang
(74) *Attorney, Agent, or Firm* — BRYAN CAVE LEIGHTON PAISNER LLP (57) ABSTRACT A system including one or more processors and one or more non-transitory computer-readable media storing computing instructions configured to run on the one or more processors and perform obtaining a set of items that have been grouped together as matching items in a group; performing an ensemble mismatch detection; performing multiple detection models on the set of items to generate respective outputs regarding mismatches; combining the respective outputs to determine whether a quantity of detected mismatches is at least a predetermined threshold; when the quantity of detected mismatches is at least the predetermined threshold, the acts also can include separating at least one of the set of items from the group; and when the quantity of detected mismatches is not at least the predetermined threshold, the acts additionally can include maintaining each item of the set of items in the group. Other embodiments are disclosed.

20 Claims, 7 Drawing Sheets (56) References Cited

U.S. PATENT DOCUMENTS

| | | |
|---|---|---|
| 2015/0199324 A1 | 7/2015 | Nishioka |
| 2015/0379117 A1* | 12/2015 | Kalinin .................. G16B 40/30 |
| | | 707/737 |
| 2016/0078507 A1 | 3/2016 | Shivaswamy et al. |
| 2016/0148222 A1 | 5/2016 | Davar |
| 2016/0189286 A1 | 6/2016 | Zohar et al. |
| 2016/0196350 A1 | 7/2016 | Mau |
| 2017/0193545 A1 | 7/2017 | Zhou |
| 2018/0218429 A1* | 8/2018 | Guo .................. G06Q 30/0631 |
| 2019/0065589 A1* | 2/2019 | Wen ...................... G06F 16/951 |
| 2019/0377825 A1 | 12/2019 | Chang |
| 2020/0311108 A1 | 10/2020 | Kumar et al. |
| 2021/0049664 A1 | 2/2021 | Lundgaard |
| 2021/0073890 A1 | 3/2021 | Lee |

* cited by examiner

MISMATCH DETECTION MODEL

TECHNICAL FIELD

This disclosure relates generally relates to a mismatch detection model.

BACKGROUND

Items grouped together based on their similarity can include items that are mismatched. Some of the items are mismatched based one or more different concepts, including size, color, condition, pattern, brand, model, etc., depending on the similarity factor(s) used to group the items together. Processes for correcting the mismatches can be time consuming due to the complexity of computer-processes searching an entire catalog to identify mismatched products.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

Figure 1:
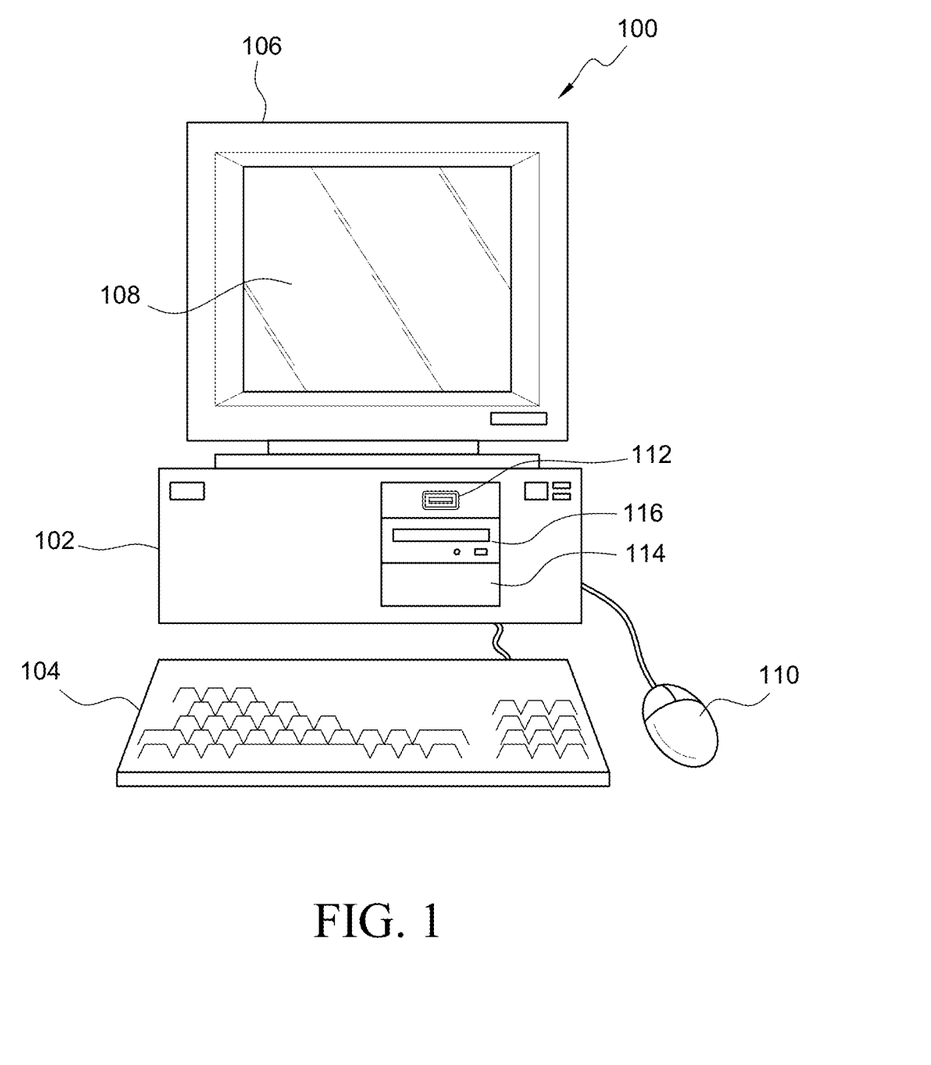
FIG. 1 illustrates a front elevational view of a computer system that is suitable for implementing an embodiment of the system disclosed in FIG. 3.
Figure 2:
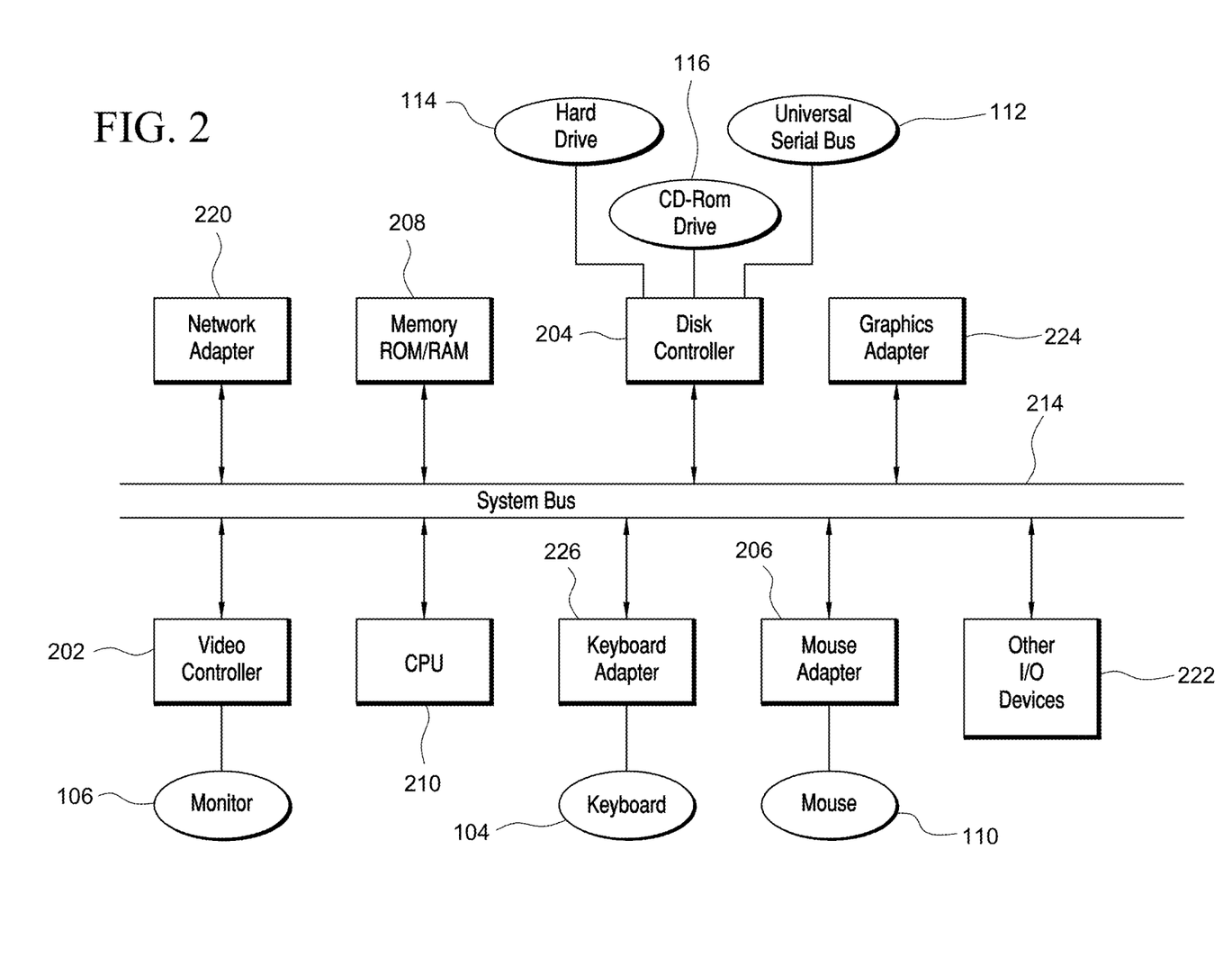
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
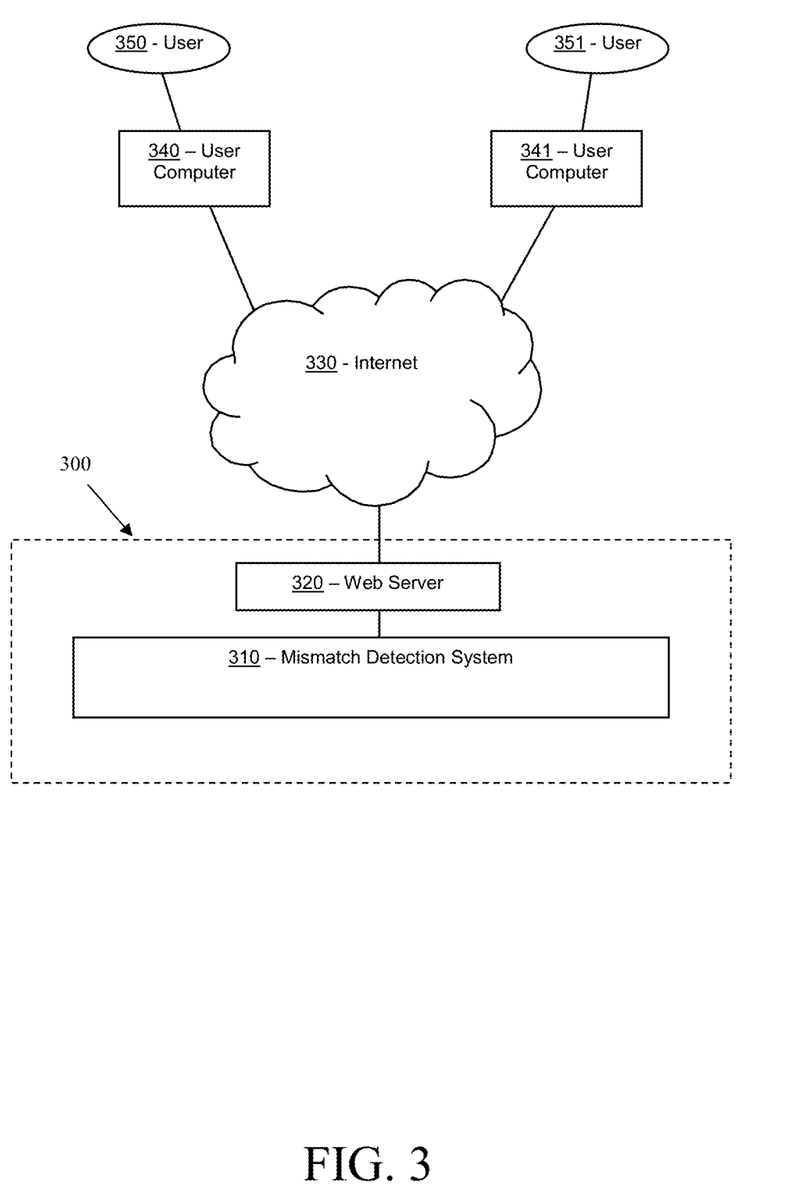
FIG. 3 illustrates a block diagram of a system that can be employed for mismatch detection model, according to an embodiment.

Turning ahead in the drawings, FIG. 3 illustrates a block diagram of a system 300 that can be employed for detecting a mismatched item in a group of matching items, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a mismatch detection system 310 and/or a web server 320. Mismatch detection system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, mismatch detection system 310 and/or web server 320. Mismatch detection system 310 can include many mismatch detection models, as described below. Additional details regarding mismatch detection system 310 and web server 320 also are described below.

In a number of embodiments, each of mismatch detection system 310 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between mismatch detection system 310 and/or web server 320 within system 300. Accordingly, in some embodiments, web server 320 and mismatch detection system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, mismatch detection system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to mismatch detection system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of mismatch detection system 310 and/or web server 320. In a similar manner, the processors and/or the non-transitory computer-readable media can be local and/or remote to each other.

Meanwhile, in many embodiments, mismatch detection system 310 and/or web server 320 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between mismatch detection system 310 and/or web server 320 and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as for example, universal serial bus(es), one or more networking cables, such as for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, mismatch detection system 310 can be a general-purpose computer or a special-purpose computer programmed to perform specific functions and/or applications. For example, mismatch detection system 310 can implement one or more machine-learning models to determine a mismatched item among a set of items grouped together as matching items in a group.

Figure 4:
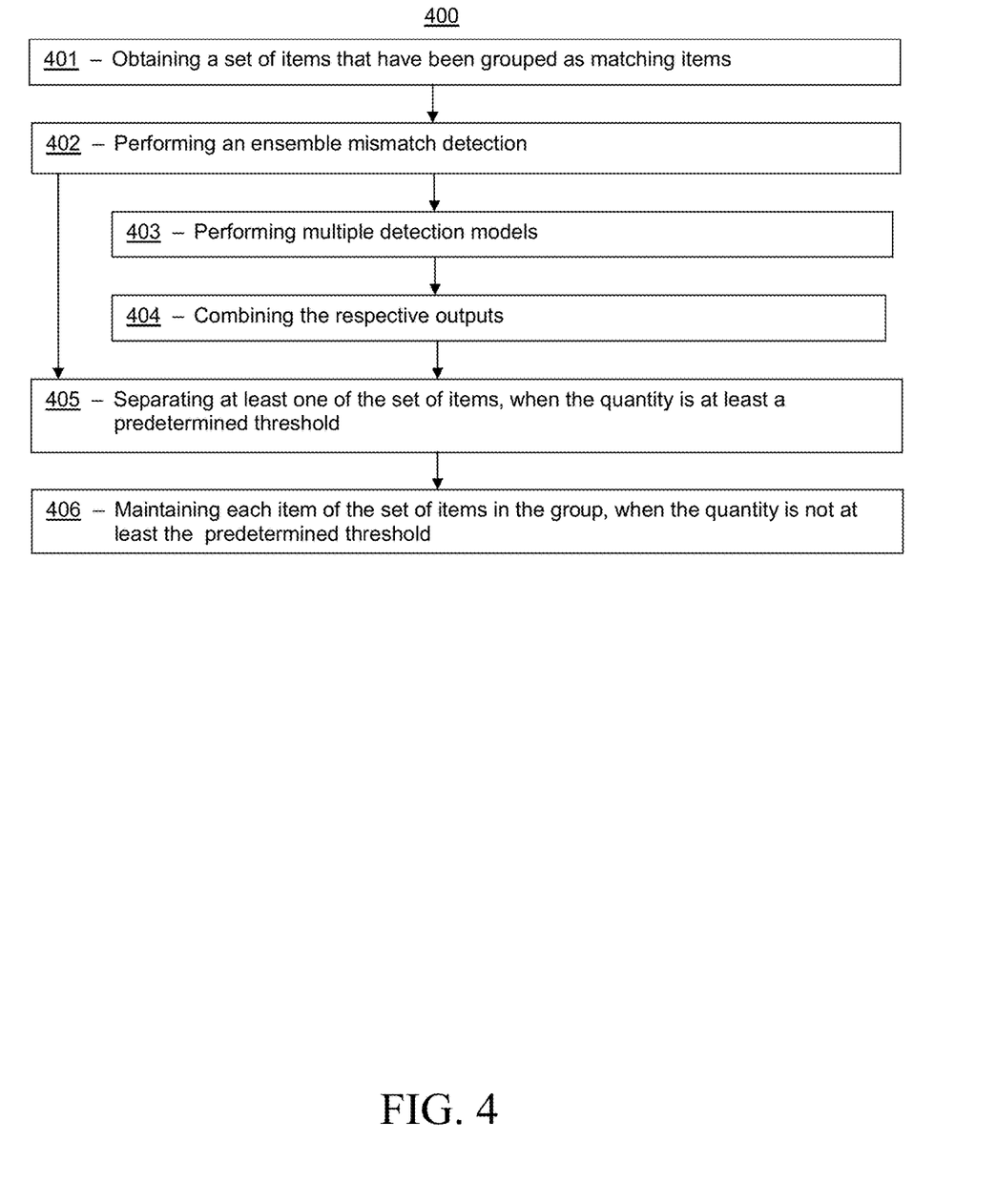
FIG. 4 illustrates a flow chart for a method, according to another embodiment.

Turning ahead in the drawings, FIG. 4 illustrates a flow chart for a method 400, according to another embodiment. In some embodiments, method 400 can be a method of implementing a mismatch detection model. In several embodiments, the mismatch detection model can automatically detect a mismatched item from a group of matching items. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as mismatch detection system 310 and/or web server 320. The processor(s) can be similar or identical to the processor(s) described above with respect to computer system 100 (FIG. 1).

Referring to FIG. 4, method 400 can include a block 401 of obtaining a set of items that have been grouped together as matching items in a group. In various embodiments, the set of items can include items (e.g., products) obtained from multiple different sources, such as different vendors and/or sellers. In some embodiments, a set of items can include multiple variants of an item. An online catalog can include over eighty-two million (82,000,000) variants of an item at any given time. In many embodiments, the set of items can be obtained from different sources and still share the same item identification, such as a barcode or a universal product code (UPC). In many embodiments, a set of items grouped as matching items can be matched by the same item identification number assigned by different sources. In several embodiments, the set of items sharing the same item identification numbers can be grouped together in an online catalog. In many embodiments, multiple different sources selling an item can use the same identification number for an item, such as a barcode and/or a universal product code (UPC) that can include mismatched items incorrectly grouped in the set of items. A product canonical format (PCF) of an item (e.g., product) includes all data of the item. The tenant PCF of the item can include taking the top item of the set of items to represent the other variants of the item in the set of items. Generally, a user views a tenant PCF of the item in an online catalog and can select variants of the item that can be sourced from multiple vendors (e.g., sellers).

In many embodiments, a set of items can include one or more variants of the item grouped together as matching items in a group, but sourced from multiple vendors. In several embodiments, a mismatched item can be included as a variant within the group. In some embodiments, the mismatched item can remain undetected within the group. For example, a user orders a blue toy listed in an online catalog, but receives a red toy instead. The blue toy and the red toy can both have the same barcode and/or UPC identification number and be from two different sources. As second example, the user selects to view a product for a shirt from an online catalog. In this second example, after the user views the shirt on a webpage shown on the user interface of the electronic device of the user, the user selects an option on the webpage to order a small size of the shirt, but the ecommerce system send the user a large size of the shirt because of a mismatched error.

In many embodiments, block 401 can have the set of items consisting of two items, and also can have the group comprising three or more items.

Figure 6:
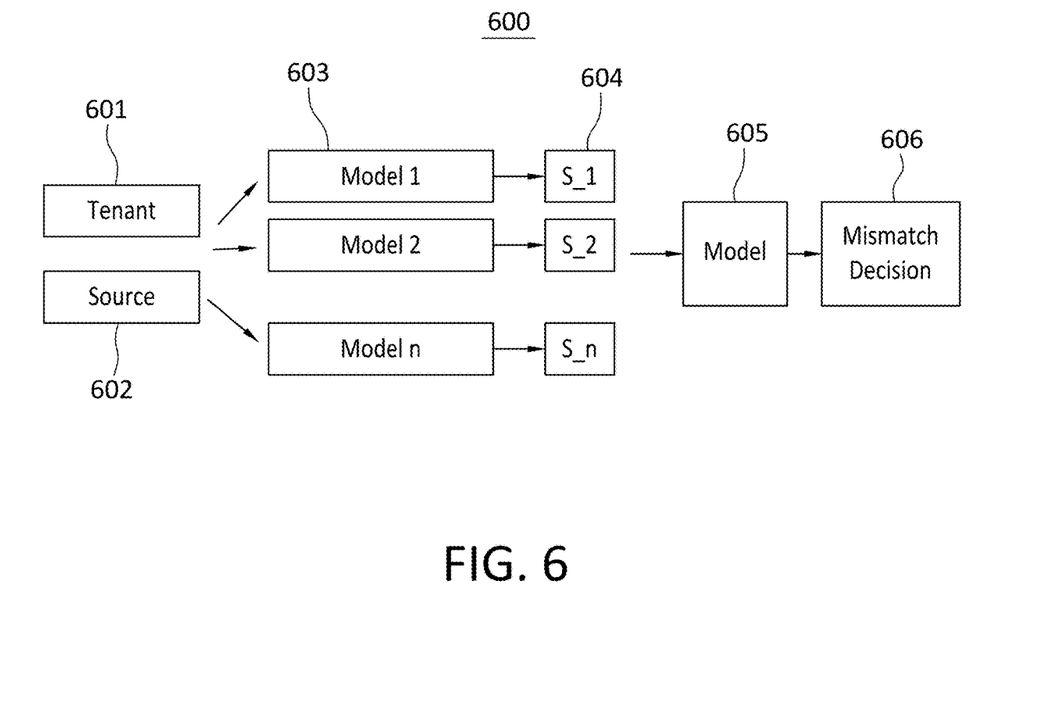
FIG. 6 illustrates a flow chart for a method, according to another embodiment.

In some embodiments, method 400 also can include a block 402 of performing an ensemble mismatch detection. In many embodiments, a mismatch error can include multiple reasons for the mismatch in the set of items. In several embodiments, the multiple reasons for the mismatch can include one or more of incorrect title description, different attributes, incorrect product data, incorrect title similarity, incorrect pack size, different condition, different price, and/or other differences. In many embodiments, detecting a mismatch for each item of the set of items can include individual or separate detection models for each of the multiple reasons to detect cases of mismatches. In some embodiments, performing an ensemble mismatch detection can include analyzing the outputs obtained from multiple individual mismatch detection models to generate a predictive indication of a mismatch based on an ensemble learning model, as shown in FIG. 6 and described below.

In various embodiments, block 402 can include multiple respective instances of the ensemble mismatch detection performed in parallel with each other on each pair of items of the items in the group when the group comprises three or more items. The parallel processing allows for the multiple respective instances of the ensemble mismatch detection to be performed simultaneously with each other.

In some embodiments, block 402 can include optional blocks 403 and 404, as described below.

In many embodiments, method 400 further can include an optional block 403 of performing multiple detection models on the set of items to generate respective outputs regarding mismatches.

In some embodiments, detecting different pack sizes and/or quantities can indicate the presence of a mismatched item in the group. In many embodiments, extracting a pack quantity from each title of each item in the group can then be compared to detect a mismatch within the group based on one or more rules. For example, a six-pack of Diet Coke can be grouped in a set of items for 12-packs of Diet Coke, but the six-pack of Diet Coke is a mismatched item in that group and can be detected using the methods described herein by comparing a quantity indicator for each item within a set of items of the group (i.e., comparing a quantity indicator of the six-pack of Diet Coke and a quantity indicator of one or more of the 12-packs of Diet Coke).

In several embodiments, detecting a condition of an item can indicate a mismatched item in the set of items of the group, such as old, new, refurbished and/or other suitable conditions. In some embodiments, extracting a condition from each title of each item in the set of items can then be compared to detect a mismatch based on one or more rules. For example, when the title of a laptop includes the word refurbished and when the group of laptops are brand new laptops, then the refurbished laptop can be identified as a mismatched item in that group using the methods described herein by comparing a title for each item within a set of items of the group (i.e., comparing a title of the refurbished laptop and a title of one or more of the brand new laptops).

In several embodiments, detecting a price of an item within a predetermined price range can indicate a mismatched item in the set of items of the group. In many embodiments, a predetermined price range of five (5) times more than items in the set of items can indicate a mismatched price. In some embodiments, prices for each item in the set of items are extracted from the tenant PCF and the source of the item. In many embodiments, hypothesis testing can be used to determine whether a price of an item is significantly different from prices of items in the set of items. In several embodiments, a significantly different price of an item can indicate a mismatched item.

In several embodiments, block 403 of performing multiple detection models can include using a Siamese network model with contrastive loss based at least in part on at least one of a respective title or a respective description for each of the set of items. In many embodiments, a different title and description of an item can indicate an item is a different item from the set of items with similar titles and descriptions. In some embodiments, detecting mismatched products by comparing the similarity of the title and descriptions of each item in the set of items can include using a title and description similarity model, such as a Siamese network model with contrastive loss. Using a Siamese network with contrastive loss can consist of two identical neural networks, each analyzing two identical sets of input vectors for similarity and regularizing the weights (e.g., weight decay) for learning by contrastive loss. The weight decay can apply identical sets of weights to each input vector working in tandem on two different input vectors to compute output vectors. The contrastive loss calculates the similarity between the two input vectors. In several embodiments, transforming each title and description of one of two items into vectors can be used as input 1 and input 2 using the Siamese network with contrastive loss to differentiate between the two input vectors. The output of using the Siamese network with contrastive loss can be a binary output of 1 or 0, where a 1 indicates the two inputs are similar and a 0 indicates the two inputs are not similar, which signifies a mismatch.

In many embodiments, using a Siamese network model with contrastive loss can detect whether two titles and or two descriptions for two items of the set of items are similar or not similar. In several embodiments, detecting a mismatched item can include determining two titles or two descriptions are not similar indicating one of the items can be a mismatched item. In some embodiments, detecting mismatched products by comparing the similarity of attribute values of each item in the set of items can include using an attribute similarity, such as a Siamese network model with contrastive loss.

In some embodiments, block 403 performing multiple detection models can include using the Siamese network model with contrastive loss based at least in part on one or more respective attributes for each of the set of items. In many embodiments, two items in a set of items can include similar items, most of which have the same attribute value but one or more of which have one or more different attribute values, indicating that the one or more items with the one or more different attribute values are mismatched item(s) in the set of items.

In various embodiments, using a Siamese network model with contrastive loss can detect whether two sets of attribute values for two items of the set of items are similar or not similar. In several embodiments, detecting a mismatched item can include determining two titles or two descriptions are not similar indicating one of the items can be a mismatched item.

In many embodiments, performing multiple detection models in block 403 can include using a convolutional neural network based on a respective title word matrix for each of the items. In several embodiments, a mismatched item can be a similar item with different model numbers, and/or other item identifiers. In many embodiments, detecting a mismatch can be detected by performing a word level comparison using characters between two titles of two items using a convolutional neural network. In various embodiments, an interaction action matrix model can be used to indicate exact same tokens in each of the two titles. In several embodiments, extracting tokens for each word in each of two titles can be compared on the token level and position of each token to differentiate one title from the other.

In various embodiments, performing multiple detection models in block 403 also can include using fuzzy matching based on respective titles of the items. In some embodiments, detecting title similarity of each item in a set of items can include detecting whether each title is the same or different using fuzzy matching, such as fuzzywuzzy in Python.

In many embodiments, a different title can indicate the item is a different product. In several embodiments, item information including item titles can include text errors, misspellings, and/or other errors. Detecting a mismatch for title similarity can be based on fuzzy matching using the Levenshtein distance that measures the minimum number of edits needed to change a one word sequence into another word-sequence. In many embodiments, fuzzy matching can compare the edit distance of one string of text from each title to another title based on the number of edits needed to change one string of text into another. In several embodiments, using fuzzy matching can determine how similar each title of the item is to another title in the set of items. In many embodiments, an edit distance above a predetermined threshold can indicate the titles of two items in the set of items are not the same. In some embodiments, an edit distance above the predetermined threshold can indicate a mismatched item in the set of items as a different title can indicate a different item not matching the set of items.

In some embodiments, the multiple detection models are performed in parallel with each other. In the same or different embodiments, a quantity of the multiple detection models is at least three. In some embodiments, seven detection models are performed in parallel with each other for a pair of items that are compared with each other, and in a related embodiment, seven detection models are performed in parallel with each other for each of ten pairs of items that are compared with each other in parallel.

In various embodiments, method 400 additionally can include an optional block 404 of combining the respective outputs of the multiple detection models to determine whether a quantity of detected mismatches is at least a predetermined threshold. In some embodiments, one or more outputs of one or more individual detection models can include one or more indications of a mismatch. In various embodiments, the individual indications collectively can create the final mismatch decision based on ensemble learning. In some embodiments, the final mismatch decision can be based on at least a predetermined threshold based on a number of mismatch indications for an item.

In some embodiments, training input data for an ensemble learning model can include tenant PCF data and source PCF data for the item.

In many embodiments, the predetermined threshold is one. In several embodiments, detecting a mismatched item can include one or more mismatch indications of one or more individual detection models.

In some embodiments, after block 402 (and/or after one or more of blocks 403 and/or 404), method 400 also can include a block 405 of separating at least one of the set of items from the group. In many embodiments, separating at least one of the set of items from the group can occur when the quantity of detected mismatches is at least the predetermined threshold.

In various embodiments, method 400 further can include a block 406 of maintaining each item of the set of items in the group. In several embodiments, maintaining each item of the set of items in the group can occur when the quantity of detected mismatches is not at least the predetermined threshold. Method 400 typically performs only one of blocks 405 or 406 after performing block 402.

After performing block 405 or 406, method 400 also can include transmitting the group, as revised if block 405 was performed or as unrevised if block 406 was performed, to be displayed on a user interface on an electronic device in response to a request from the user interface to view the products or services of the group.

Figure 5:
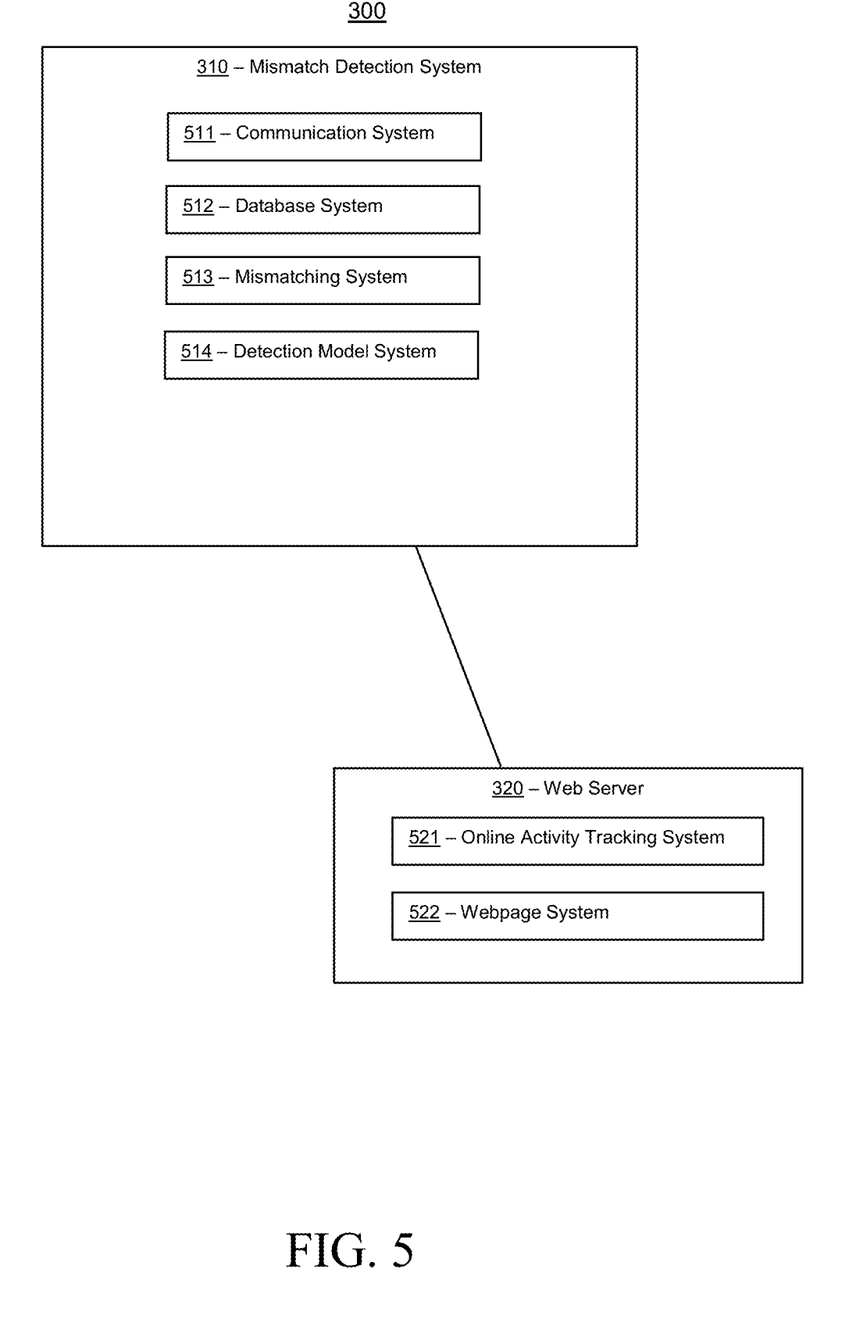
FIG. 5 illustrates a representative block diagram of FIG. 3.

Turning to the next drawing, FIG. 5 illustrates a block diagram of system 300, according to the embodiment shown in FIG. 3. Mismatch detection system 310 and/or web server 320 are merely exemplary and are not limited to the embodiments presented herein. Mismatch detection system 310 and/or web server 320 can be employed in many different embodiments or examples not specifically depicted or described herein. In some embodiments, certain elements or systems of mismatch detection system 310 and/or web server 320 can perform various procedures, processes, and/or acts. In other embodiments, the procedures, processes, and/or acts can be performed by other suitable elements or systems. In many embodiments, the systems of mismatch detection system 310 and/or web server 320 can be modules of computing instructions (e.g., software modules) stored at non-transitory computer readable media. In other embodiments, the systems of mismatch detection system 310 and/or web server 320 can be implemented in hardware.

In many embodiments, mismatch detection system 310 can include a communication system 511. In a number of embodiments, communication system 511 can at least partially perform block 401 (FIG. 4) of obtaining a set of items that have been grouped together as matching items in a group, block 701 (FIG. 7, described below) of transmitting input 1 of an item into a twin neural network number 1 and/or block 703 (FIG. 7, described below) of processing the input 1.

In several embodiments, mismatch detection system 310 also can include a database system 512. In various embodiments, database system 512 can at least partially perform block 402 (FIG. 4) of performing an ensemble mismatch detection, block 403 (FIG. 4) of performing multiple detection models, block 404 (FIG. 4) of combining respective outputs of the multiple detection models, block 601 (FIG. 6, described below) of receiving tenant PCF and/or block 602 (FIG. 6, described below) of receiving source PCF.

In some embodiments, mismatch detection system 310 additionally can include a transformation system 513. In many embodiments, transformation system 513 can at least partially perform block 402 (FIG. 4) of performing an ensemble mismatch detection, block 403 (FIG. 4) of performing multiple detection models, block 404 (FIG. 4) of combining the respective outputs to determine whether a quantity of detected mismatches is at least a predetermined threshold, block 405 (FIG. 4) of separating at least one of the set of items from the group, block 406 (FIG. 4) of maintaining each item of the set of items in the group, block 604 (FIG. 6, described below) of transmitting one or more outputs of the one or more individual detection models to an ensemble model and/or block 606 (FIG. 6, described below) of determining a final mismatch decision.

In some embodiments, mismatch detection system 310 additionally can include a transformation system 514. In many embodiments, transformation system 514 can at least partially perform block 402 (FIG. 4) of performing an ensemble mismatch detection, block 403 (FIG. 4) of performing multiple detection models on the set of items to generate respective outputs regarding mismatches, of performing multiple detection models can include using a Siamese network model with contrastive loss based at least in part on at least one of a respective title or a respective description for each of the set of items, performing multiple detection models can include using the Siamese network model with contrastive loss based at least in part on one or more respective attributes for each of the set of items, can include performing multiple detection models can include using a convolutional neural network based on a respective title word matrix for each of the items, can include performing multiple detection models can include using a fuzzy matching based on respective titles of the items, block 404 (FIG. 4) of combining respective outputs of the multiple detection models, block 603 (FIG. 6, described below) of implementing one or more individual detection models, block 605 (FIG. 6, described below) of executing an ensemble learning model, block 702 (FIG. 7, described below) of transmitting a input 2 of an item into a twin neural network number 2, block 704 (FIG. 7, described below) of processing the input 2, block 705 (FIG. 7, described below) of applying identical weight decay functions to each of the twin neural networks, block 706 (FIG. 7, described below) of receiving the output from the twin neural networks, block 707 (FIG. 7, described below) of receiving the output to that can differentiate input 1 from input 2, block 708 (FIG. 7, described below) of calculating a contrastive loss function and/or block 709 (FIG. 7, described below) of transmitting a label as input to the contrastive loss function.

In a number of embodiments, web server 320 can include an online activity tracking system 521. In many embodiments, online activity tracking system 521 can at least partially perform gathering information regarding online orders that is provided to database system 512, mismatching system 513, and/or detection model system 514.

In several embodiments, web server 320 can include a webpage system 522. Webpage system 522 can at least partially perform sending instructions to user computers (e.g., 350-351 (FIG. 3)) and/or associate devices (e.g., 370-371 (FIG. 3)) based on information received from communication system 511.

Turning ahead in the drawings, FIG. 6 illustrates a flow chart of method 600, according to another embodiment. Method 600 can be similar to method 400 (FIG. 4), and various procedures, processes, and/or activities of method 600 can be similar or identical to various procedures, processes, and/or activities of method 400 (FIG. 4). Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as voice command system 310 and/or web server 320. The processor(s) can be similar or identical to the processor(s) described above with respect to computer system 100 (FIG. 1).

In many embodiments, method 600 can include a block 601 of receiving tenant PCF. In several embodiments, tenant PCF can be used as input data for one or more individual detection models In several embodiments, method 600 also can include a block 602 of receiving source PCF. In some embodiments, source PCF can be used as input data for one or more individual detection models.

In various embodiments, method 600 further can include a block 603 of implementing one or more individual detection models, up to "n" detection models.

In some embodiments, method 600 also can include a block 604 of transmitting one or more outputs of the one or more individual detection models to an ensemble model.

In many embodiments, method 600 further can include a block 605 of executing an ensemble learning model.

In various embodiments, method 600 additionally can include a block 606 of determining a final mismatch decision. In some embodiments, the final mismatch decision can be based on the output of one or more individual detection models. In several embodiments, the final mismatch decision can be based on the output of the ensemble learning model. In some embodiments, the final mismatch decision can be based on a predetermined threshold of the output of the ensemble learning model. In many embodiments, the final mismatch decision can be based on a weight applied to one or more individual detection models as used in the executed in the ensemble learning model.

Figure 7:
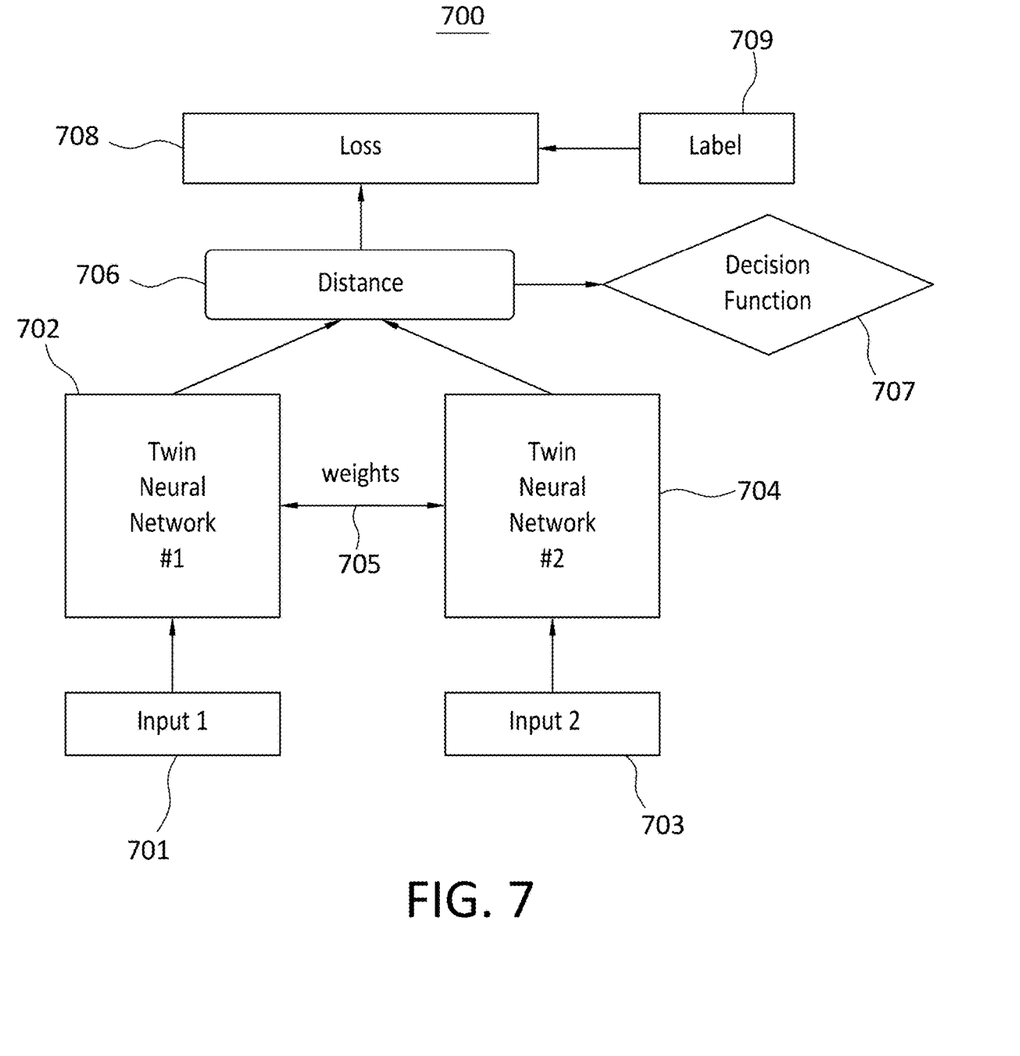
FIG. 7 illustrates a flow chart for a method, according to another embodiment.

Turning ahead in the drawings, FIG. 7 illustrates a flow chart of method 700, according to another embodiment. Method 700 can be similar to method 400 (FIG. 4), and various procedures, processes, and/or activities of method 700 can be similar or identical to various procedures, processes, and/or activities of method 400 (FIG. 4). Method 700 can be employed in many different embodiments and/or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In several embodiments, system 300 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as mismatch detection system 310 and/or web server 320. The processor(s) can be similar or identical to the processor(s) described above with respect to computer system 100 (FIG. 1).

Using a Siamese network with contrastive loss can consist of two identical neural networks each analyzing two identical sets of input vectors for similarity and regularizing the weights (e.g., weight decay) for learning by contrastive loss. The weight decay can apply identical sets of weights to each input vector working in tandem on two different input vectors to compute output vectors. The contrastive loss calculates the similarity between the two input vectors. In several embodiments, transforming each title and description of one of two items into vectors can be used as input 1 and input 2 using the Siamese network with contrastive loss to differentiate between the two input vectors. The output of the using the Siamese network with contrastive loss can be a binary output of 1 or 0 where a 1 indicates the two inputs are similar a 0 indicates the two inputs are not similar.

In many embodiments, method 700 can include a block 701 of transmitting input 1 of an item into a twin neural network number 1.

In some embodiments, method 700 can include a block 702 of processing the input 1 in a twin neural network 1.

In several embodiments, method 700 can include a block 703 of transmitting input 2 of an item into a twin neural network number 2.

In many embodiments, method 700 can include a block 704 of processing the input 2 in a twin neural network 2.

In various embodiments, method 700 can include a block 705 of applying identical weight decay functions to each of the twin neural networks 1 and 2.

In some embodiments, method 700 can include block 706 of receiving the output from the twin neural networks and to determine the relevant distance.

In several embodiments, method 700 can include block 707 of receiving the output from the distance determination in block 706 to make relevant decisions.

In some embodiments, method 700 can include block 708 of calculating a contrastive loss function based on the distance determination in block 708.

In various embodiments, method 700 can include block 709 of transmitting a label as input to the contrastive loss function in block 708.

A set of items grouped together as matching items can include mismatched items. A mismatched product in a group of items can be mismatched based on differences in pack-size, product features, size, color, brand, condition, model, watts, price, and/or other suitable mismatched reasons. Conventionally, discovering a mismatched item can be either a manual process or left undiscovered. A mismatch detection model is an improvement over the conventional approach to identifying mismatched items in a group of matching items.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of products and/or items sold on the website can exceed approximately ten million (10,000,000) approximately each day. A set of items can include multiple variants of an item. An online catalog can include over eighty-two million (82,000,000) variants of an item at any given time.

In a number of embodiments, the techniques described herein can advantageously provide a consistent user experience by dynamically updating the tenant PCF for online catalog data reducing errors in receiving the correct item or variant of the item ordered. The set of items can be obtained from different sources and still share the same item identification, such as a barcode or a universal product code (UPC). In many embodiments, a set of items grouped as matching items can be matched by the same item identification number assigned by different sources. In several embodiments, the set of items sharing the same item identification numbers can be grouped together in an online catalog. In many embodiments, multiple different sources selling an item can use the same identification number for an item, such as a barcode and/or a universal product code (UPC) that can include mismatched items incorrectly grouped in the set of items. A product canonical format (PCF) of an item (e.g., product) includes all data of the item. The tenant PCF of the item can include taking the top item of the set of items to represent the other variants of the item in the set of items. Generally, a user views a tenant PCF of the item in an online catalog and can select variants of the item that can be sourced from multiple vendors (e.g., sellers).

In a number of embodiments, the techniques described herein can solve a technical problem that arises only within the realm of computer networks, as detecting mismatched item in a group of matching items using multiple machine learning models, as trained, it does not exist outside the realm of computer networks. Moreover, the techniques described herein can solve a technical problem that cannot be solved outside the context of computer networks. Specifically, the techniques described herein cannot be used outside the context of computer networks, in view ensemble learning using multiple machine learning models, as trained, and because a content catalog, such as an online catalog, that can power and/or feed an online website that is part of the techniques described herein would not exist.

Various embodiments include a system. The system can include one or more processors and one or more non-transitory computer-readable media storing computing instructions configured to run on the one or more processors and perform certain acts. The acts can include obtaining a set of items that have been grouped together as matching items in a group. The items in the group can be the set of items. The acts also can include performing an ensemble mismatch detection. The acts further can include performing multiple detection models on the set of items to generate respective outputs regarding mismatches. The acts also can include combining the respective outputs to determine whether a quantity of detected mismatches is at least a predetermined threshold. When the quantity of detected mismatches is at least the predetermined threshold, the acts also can include separating at least one of the set of items from the group. When the quantity of detected mismatches is not at least the predetermined threshold, the acts additionally can include maintaining each item of the set of items in the group.

Many embodiments can include a method. The method can be implemented via execution of computing instructions configured to run at one or more processors and stored at one or more non-transitory computer-readable media. The method can include obtaining a set of items that have been grouped together as matching items in a group. The items in the group can be the set of items. The method also can include performing an ensemble mismatch detection. The method further can include performing multiple detection models on the set of items to generate respective outputs regarding mismatches. The method additionally can include combining the respective outputs to determine whether a quantity of detected mismatches is at least a predetermined threshold. When the quantity of detected mismatches is at least the predetermined threshold, the method further can include separating at least one of the set of items from the group. When the quantity of detected mismatches is not at least the predetermined threshold, the method also can include maintaining each item of the set of items in the group.

Although automatically determining a mismatched item in a group of matching items using the mismatch detection model has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 3-8 may include different procedures, processes, and/or activities and be performed by many different modules, in many different orders, and/or one or more of the procedures, processes, or activities of FIGS. 3-8 may include one or more of the procedures, processes, or activities of another different one of FIGS. 3-8. As another example, the systems within mismatch detection system 310 and/or webserver 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform:
      training an ensemble learning model using training input data for a set of training items, wherein the ensemble learning model comprises multiple detection models, and wherein respective training outputs obtained for each of the multiple detection models are combined to generate a predictive indication of a mismatch based on the ensemble learning model;

obtaining a set of items that have been grouped together as matching items in a group, wherein the items in the group comprise the set of items;

performing an ensemble mismatch detection, wherein multiple respective instances of the ensemble mismatch detection are further performed simultaneously with each other, and wherein performing the ensemble mismatch detection further comprises:

performing multiple detection models on the set of items to generate respective outputs regarding mismatches, wherein the items in the group comprise the set of items, and wherein the respective outputs comprise one or more mismatch indications;

combining the respective outputs of each multiple detection model of the multiple detection models; and determining, by an ensemble learning model, a final mismatch decision for an item of the set of items, wherein the one or more mismatch indications collectively create the final mismatch decision, and wherein the final mismatch decision is based on whether a quantity of detected mismatches is at least a predetermined threshold of a number of mismatch indications for the item of the set of items and the respective outputs of each multiple detection model;

when the quantity of detected mismatches is at least the predetermined threshold, separating at least one of the set of items from the group; and when the quantity of detected mismatches is not at least the predetermined threshold, maintaining each item of the set of items in the group.

2. The system of claim 1, wherein:
the training input data for the set of training items for the multiple detection models comprises one or more of:
respective tenant data and respective source data for each item of the set of items;
the respective tenant data comprises tenant product canonical format (PCF) data;
the respective source data comprises source PCF data;
the set of items consists of two items; and
the group comprises three or more items; and
the final mismatch decision is further based on a weight applied to one or more detection models used in the ensemble learning model.

3. The system of claim 1, wherein:
the multiple respective instances of the ensemble mismatch detection are performed in parallel with each other on each pair of items of three or more items.

4. The system of claim 1, wherein the multiple detection models comprise:
a Siamese network model with contrastive loss based at least in part on at least one of a respective title or a respective description for each of the set of items.

5. The system of claim 4, wherein the multiple detection models further comprise:
the Siamese network model with contrastive loss based at least in part on one or more respective attributes for each of the set of items.

6. The system of claim 1, wherein the multiple detection models comprise:

a convolutional neural network based on a respective title word matrix for each of the items.

7. The system of claim 1, wherein the multiple detection models comprise:
a fuzzy matching based on respective titles of the items.

8. The system of claim 1, wherein the predetermined threshold is one.

9. The system of claim 1, wherein the multiple detection models are performed in parallel with each other on the set of items.

10. The system of claim 1, wherein a quantity of the multiple detection models is at least three.

11. A method being implemented via execution of computing instructions configured to run at one or more processors and stored at one or more non-transitory computer-readable media, the method comprising:

training an ensemble learning model using training input data for a set of training items, wherein the ensemble learning model comprises multiple detection models, and wherein respective training outputs obtained for each of the multiple detection models are combined to generate a predictive indication of a mismatch based on the ensemble learning model;

obtaining a set of items that have been grouped together as matching items in a group, wherein the items in the group comprise the set of items;

performing an ensemble mismatch detection, wherein multiple respective instances of the ensemble mismatch detection are further performed simultaneously with each other, and wherein performing the ensemble mismatch detection further comprises comprising:

performing multiple detection models on the set of items to generate respective outputs regarding mismatches, wherein the items in the group comprise the set of items, and wherein the respective outputs comprise one or more mismatch indications;

combining the respective outputs of each multiple detection model of the multiple detection models; and determining, by an ensemble learning model, a final mismatch decision for an item of the set of items, wherein the one or more mismatch indications collectively create the final mismatch decision, and wherein the final mismatch decision is based on whether a quantity of detected mismatches is at least a predetermined threshold of a number of mismatch indications for the item of the set of items and the respective outputs of each multiple detection model;

when the quantity of detected mismatches is at least the predetermined threshold, separating at least one of the set of items from the group; and when the quantity of detected mismatches is not at least the predetermined threshold, maintaining each item of the set of items in the group.

12. The method of claim 11, wherein:
the training input data for the set of training items for the multiple detection models comprises one or more of:
respective tenant data and respective source data for each item of the set of items;
the respective tenant data comprises tenant product canonical format (PCF) data;
the respective source data comprises source PCF data;
the set of items consists of two items; and
the group comprises three or more items; and
the final mismatch decision is further based on a weight applied to one or more detection models used in the ensemble learning model.

13. The method of claim 11, wherein:
the multiple respective instances of the ensemble mismatch detection are performed in parallel with each other on each pair of items of three or more items.

14. The method of claim 11, wherein the multiple detection models comprise:
a Siamese network model with contrastive loss based at least in part on at least one of a respective title or a respective description for each of the set of items.

15. The method of claim 14, wherein the multiple detection models further comprises:
the Siamese network model with contrastive loss based at least in part on one or more respective attributes for each of the set of items.

16. The method of claim 11, wherein the multiple detection models comprise:
a convolutional neural network based on a respective title word matrix for each of the items.

17. The method of claim 11, wherein the multiple detection models comprise:
a fuzzy matching based on respective titles of the items.

18. The method of claim 11, wherein the predetermined threshold is one.

19. The method of claim 11, wherein the multiple detection models are performed in parallel with each other on the set of items.

20. The method of claim 11, wherein a quantity of the multiple detection models is at least three.

* * * * *